(12) United States Patent
Breusa et al.

(10) Patent No.: US 10,738,891 B2
(45) Date of Patent: Aug. 11, 2020

(54) SEAL ASSEMBLY FOR A ROTATING MEMBER

(71) Applicant: FREUDENBERG SEALING TECHNOLOGIES S.A.S. DI EXTERNA ITALIA S.R.L.U., Pinerolo (IT)

(72) Inventors: Luca Breusa, Pinerolo (IT); Maurizio Buro, Pinerolo (IT); Pasquale Angiulli, Pinerolo (IT); Massimo Barban, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 124 days.

(21) Appl. No.: 15/808,505

(22) Filed: Nov. 9, 2017

(65) Prior Publication Data
US 2018/0128376 A1     May 10, 2018

(30) Foreign Application Priority Data
Nov. 10, 2016 (IT) .................... 102016000113594

(51) Int. Cl.
*F16J 15/3244* (2016.01)
*F16J 15/3204* (2016.01)
(Continued)

(52) U.S. Cl.
CPC ....... *F16J 15/3244* (2013.01); *F16J 15/3204* (2013.01); *F16J 15/3256* (2013.01);
(Continued)

(58) Field of Classification Search
CPC .... F16J 15/3204; F16J 15/3208; F16J 15/322; F16J 15/3224; F16J 15/3232;
(Continued)

(56) References Cited

U.S. PATENT DOCUMENTS

| 4,844,484 A | * | 7/1989 | Antonini | .............. F16J 15/3224 277/561 |
| 5,346,662 A | * | 9/1994 | Black | ...................... B29C 70/84 264/138 |

(Continued)

OTHER PUBLICATIONS

Corresponding Italian Search Report for IT20160113594 dated Sep. 12, 2017. IT.

*Primary Examiner* — Nicholas L Foster
(74) *Attorney, Agent, or Firm* — The Belles Group, P.C.

(57) ABSTRACT

A seal assembly for sealing the compartment between a rotating member and a fixed element. The seal assembly comprises a first ring fixed to the rotating member, a second ring fixed to the fixed element, and a seal element. The seal element is carried by the second ring and is connected to said second ring by means of a fitted portion; the seal element comprises at least one annular pad having an annular seal edge. The annular seal edge projects towards a coupling portion of the first ring and is adapted to cooperate with the coupling portion along a substantially linear area of contact. The seal element further comprises a spring portion adapted to exert an elastic force on the annular pad so as to push the annular seal edge towards the coupling portion.

18 Claims, 8 Drawing Sheets

(51) Int. Cl.
*F16J 15/3256* (2016.01)
*F16J 15/3268* (2016.01)
*F16J 15/3284* (2016.01)
*F16J 15/3252* (2016.01)

(52) U.S. Cl.
CPC ....... *F16J 15/3268* (2013.01); *F16J 15/3284* (2013.01); *F16J 15/3252* (2013.01)

(58) Field of Classification Search
CPC .. F16J 15/3244; F16J 15/3256; F16J 15/3264; F16J 15/3268
See application file for complete search history.

(56) References Cited

U.S. PATENT DOCUMENTS

| | | | | |
|---|---|---|---|---|
| 5,348,312 | A * | 9/1994 | Johnston | F16J 15/3256 277/375 |
| 6,149,158 | A * | 11/2000 | Tripathy | F16J 15/3228 277/307 |
| 6,273,428 | B1 * | 8/2001 | Sassi | F16J 15/3256 277/348 |
| 6,450,503 | B1 * | 9/2002 | Dossena | F16J 15/3256 277/549 |
| 6,789,805 | B2 * | 9/2004 | Sassi | F16J 15/3256 277/549 |
| 8,439,363 | B2 * | 5/2013 | Greca | F16J 15/3456 277/353 |
| 9,062,776 | B2 * | 6/2015 | Dlugai | F16J 15/164 |
| 10,240,678 | B2 * | 3/2019 | Toth | F16J 15/3256 |
| 2008/0128997 | A1 | 6/2008 | Berdichevsky et al. | |
| 2011/0006485 | A1 * | 1/2011 | Nakagawa | F16J 15/164 277/549 |
| 2011/0233874 | A1 | 9/2011 | Foti et al. | |
| 2012/0068416 | A1 * | 3/2012 | Greca | F16J 15/3456 277/353 |
| 2013/0322791 | A1 * | 12/2013 | Dlugai | F16J 15/164 384/91 |
| 2016/0169393 | A1 * | 6/2016 | Schmitt | F16J 15/3452 277/386 |
| 2017/0114901 | A1 * | 4/2017 | Yamanaka | F16J 15/32 |
| 2018/0023707 | A1 * | 1/2018 | Yamaguchi | F16J 15/3204 277/400 |
| 2018/0038485 | A1 * | 2/2018 | Yamanaka | F16J 15/32 |
| 2018/0038486 | A1 * | 2/2018 | Yamanaka | F16J 15/32 |
| 2018/0372222 | A1 * | 12/2018 | Nakagawa | F16J 15/3232 |

* cited by examiner

SEAL ASSEMBLY FOR A ROTATING MEMBER

CROSS-REFERENCE TO RELATED APPLICATIONS

This application claims priority from Italian Patent Application No. 102016000113594, filed on Nov. 10, 2016, the entirety of which is incorporated by reference.

TECHNICAL FIELD

The invention relates to a seal assembly for a rotating member, in particular for a crankshaft of an engine of a vehicle.

BACKGROUND

When dealing with mechanical designing, there is a need to reduce frictions by lubricating rotating members by means of an oil bath. In many applications, portions of the rotating members must be immersed in an oil bath and other portions adjacent thereto must work in a sealed environment in the absence of oil. In order to fulfil this need, seal assemblies are known, for example, from patent EP-B-2058563, said seal assemblies being designed to be housed in the compartment defined between a hollow casing, which is usually fixed, and a rotating organ housed on the inside. These assemblies, during the rotation of the rotating member, make sure that the aforesaid compartment is sealed, so as to prevent oil from flowing towards the environment that needs to operate in dry conditions.

In particular, these seal assemblies have an axial symmetry with respect to the axis of the rotating member to which they are coupled and substantially consist of a radially inner ring, which is made of a metal material and is fixed to the rotating member, of a radially outer ring, which is also made of a metal material and is fixed to the casing, and of a seal element, which is made of an elastically deformable polymer material and is interposed between the aforesaid rings.

More precisely, the elastomer material is carried by the outer ring and has, on the side facing the oil bath, a first seal lip, which is adapted to create a contact seal with a relative first coupling portion of the inner ring.

In order to reduce the typical drawback of contact seals, namely the quick operating wear of the elastomer material in the area of cooperation with the metal ring, the first seal lip is provided with a spiral groove, which has a double effect:
  it allows the seal action to be implemented by means of a simple surface contact between the first elastomer material seal lip and the inner ring, namely without any penetration of the first one into the second one; and
  thanks to the rotation of the inner ring, which is integral to the rotating member, it permits the generation of a fluid-dynamic "pumping" action for the air contained between the first seal lip and the inner ring, so as to push the oil towards the environment intended for it, thus increasing the sealing effect.

Furthermore, known seal assemblies comprise a second seal lip, which is adapted to cooperate with a second coupling portion of the inner ring, which is axially interposed between the first coupling portion and the dry environment. The second seal lip is available in a configuration of sealing contact with the second coupling portion, in case the rotating member is still, and in a configuration of detachment from the second coupling portion, in case of rotation of the rotating member. The second seal lip permits a stabilization of the respective seal assembly in static conditions compared to the seal assemblies that do not have said second lip.

The seal assemblies described above, despite ensuring a good operation in dynamic conditions, are affected by some drawbacks in static conditions.

In particular, seal assemblies of the type described above are not capable of ensuring a perfect seal of the dry environment when the rotating member is still and is arranged so as to be inclined with respect to the horizontal line, or in all those cases in which the oil level—with a still rotating member—exceeds half the rotating member itself.

In this situation, indeed, part of the seal assembly can find itself in an oil bath and the first seal lip, which is provided with the spiral groove, is not capable of ensuring, in static conditions, the same sealing action generated in dynamic conditions, namely with the help of the fluid-dynamic pumping action used to pump the oil towards the environment intended for it.

The aforesaid situation can occur, for example, when the vehicle on which the rotating member is fitted is standing still on a slope or in case the aforesaid rotating organ is mounted in an oblique position in the vehicle itself.

Furthermore, some assemblies can experience an overturning of the first seal lip in conditions of positive pressure originating from the oil bath environment, resulting in the complete loss of functionality of the seal assembly.

Moreover, in vacuum conditions on the side of the oil bath environment there can be undesired vibrations and noises.

BRIEF SUMMARY

The object of the invention is to provide a seal assembly for a rotating member, which is free from the drawbacks affecting know seal assemblies described above.

The aforesaid object is reached by the invention, as it relates to a seal assembly according to claim 1.

Preferred embodiments are set forth in the dependent claims.

BRIEF DESCRIPTION OF THE DRAWINGS

The invention will be best understood upon perusal of the following description of three preferred embodiments, which is provided by mere way of non-limiting example and with reference to the accompanying drawings, wherein.

DETAILED DESCRIPTION

Figure 1:
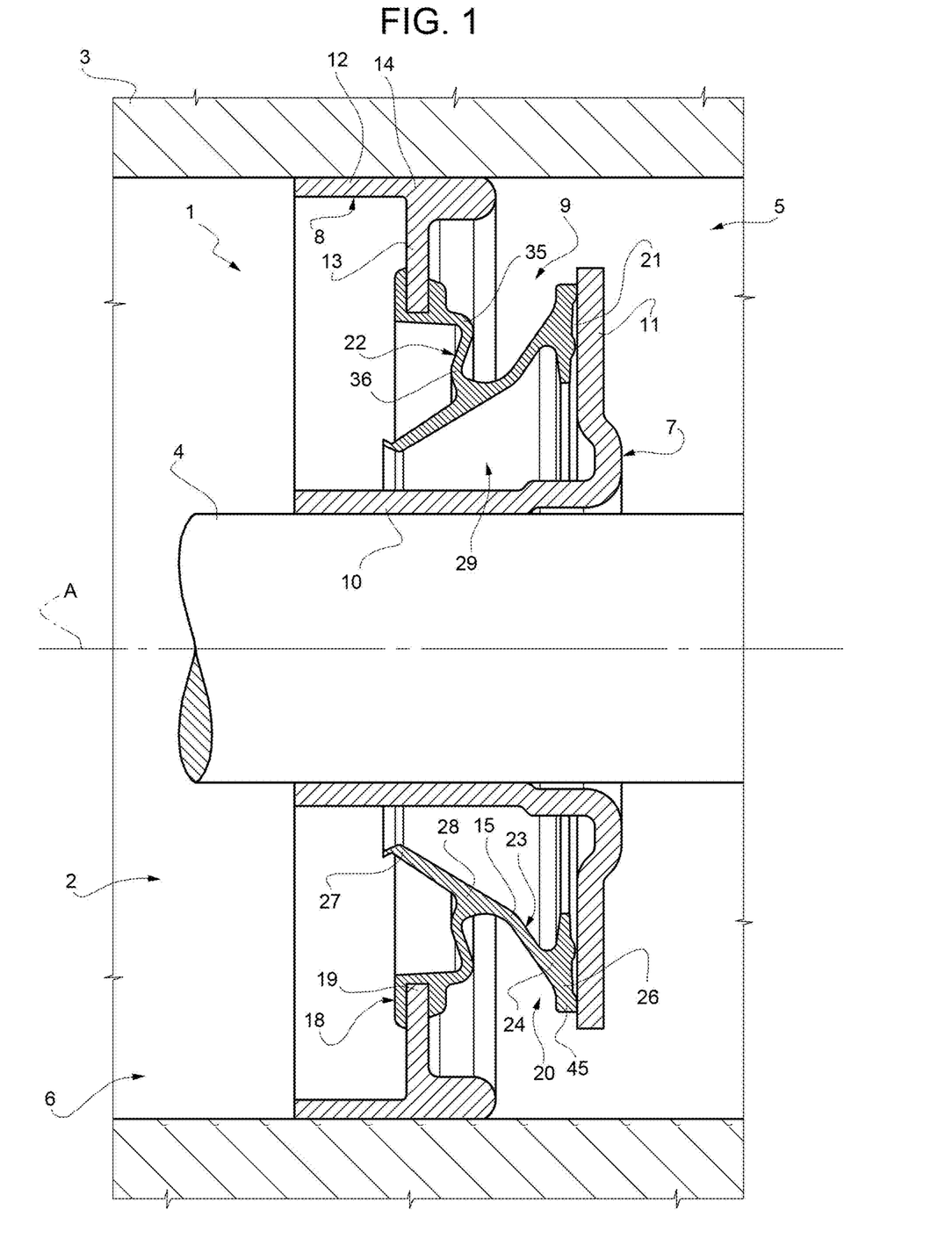
FIG. 1 is an axial section of a seal assembly for a rotating member according to a first embodiment, which is manufactured in accordance with the invention.
Figure 2:
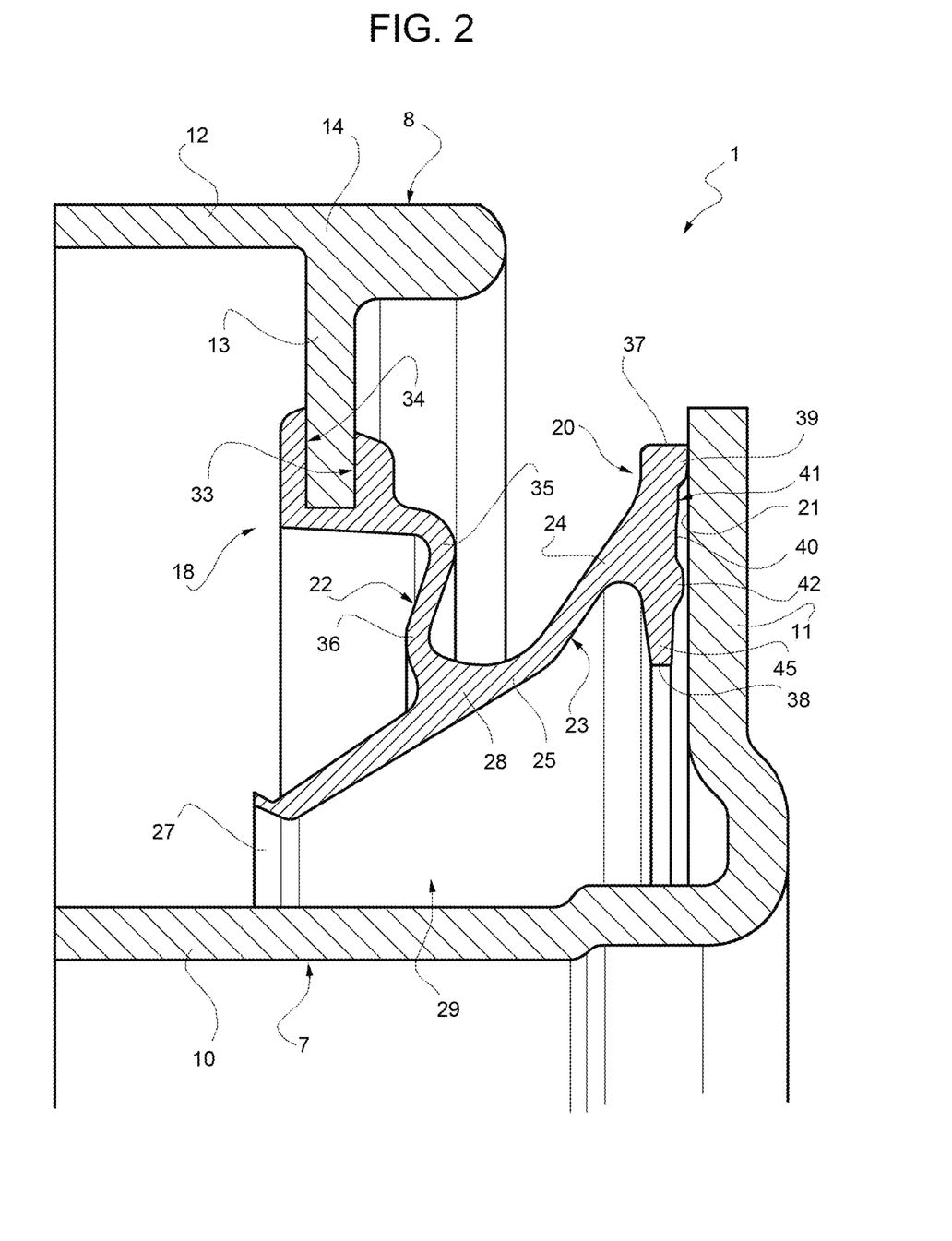
FIG. 2 is an axial semi-section, on a larger scale, of the seal assembly of FIG. 1.
Figure 3:
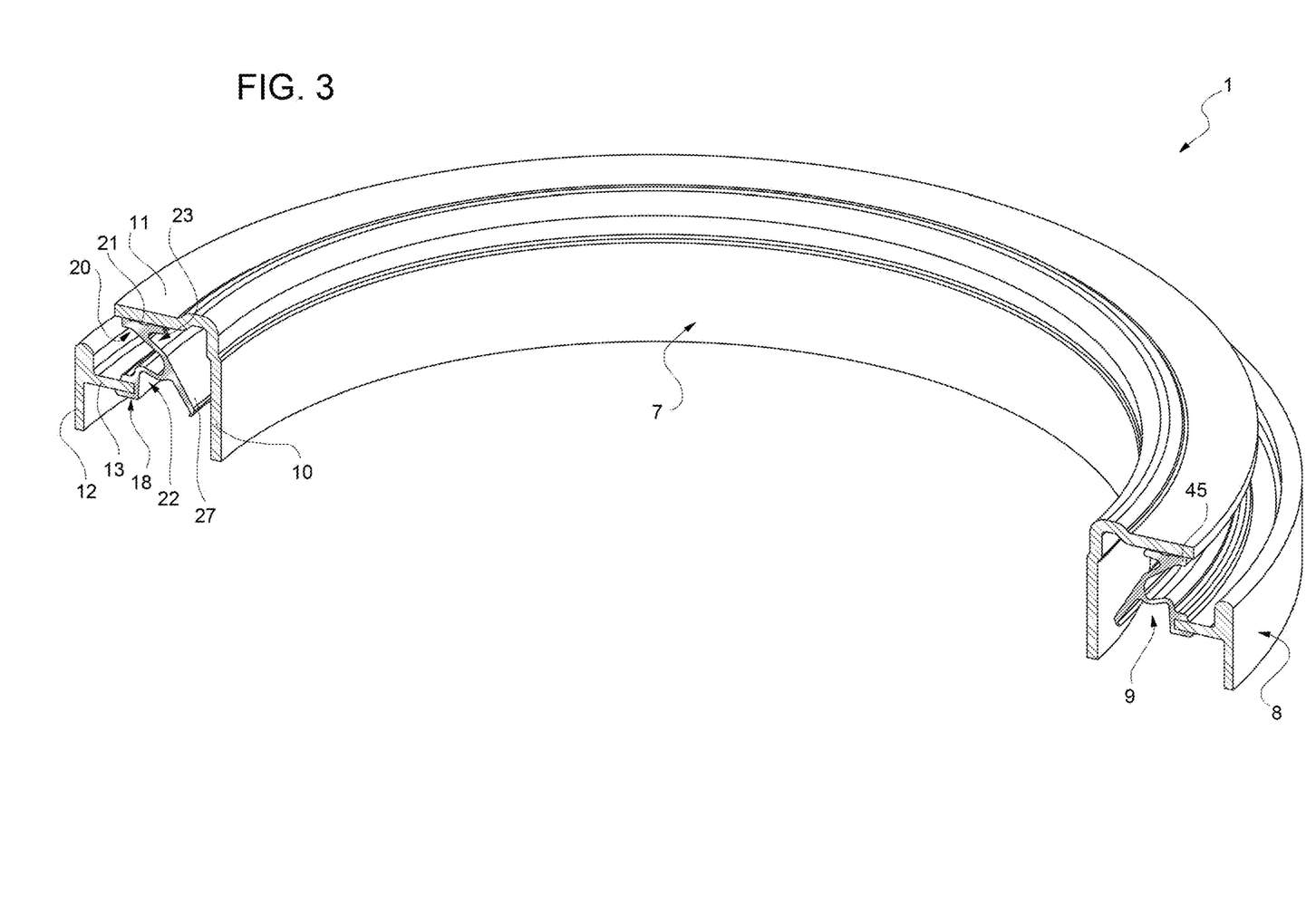
FIG. 3 is a perspective view, with an axial section, of the seal assembly of FIG. 1.
Figure 4:
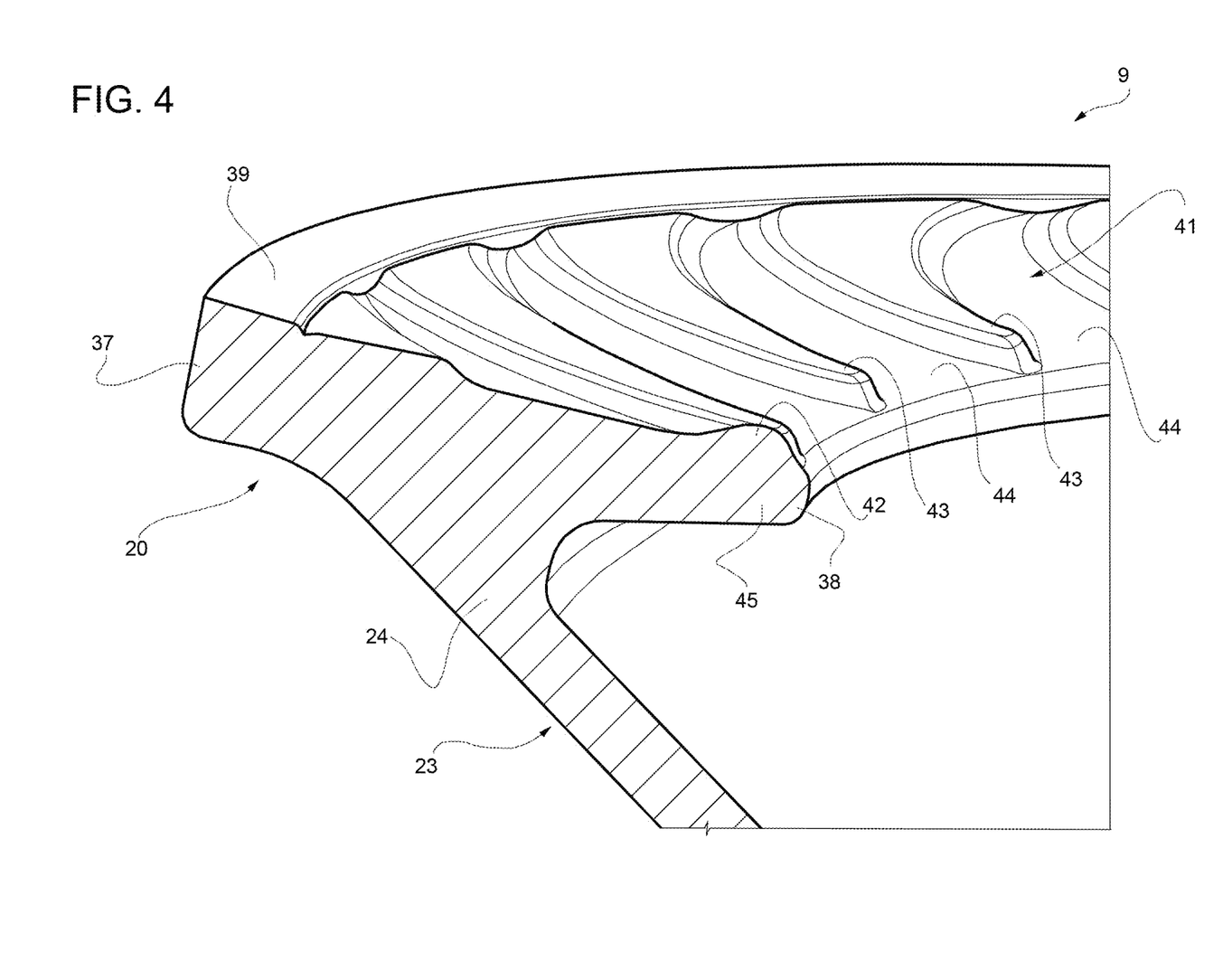
FIG. 4 is a perspective view, on a larger scale, of a detail of the seal assembly of FIGS. 1 to 3.

In FIGS. 1 to 3, number 1 indicates, as a whole, a seal assembly housed in the compartment 2 defined between a casing 3 with axis A and a rotating member, for example a shaft 4 of a vehicle housed coaxially in the casing 3. The compartment 2 has, on axially opposite sides of the seal assembly 1, a first environment 5, which is designed to house a lubricating oil bath, and a second environment 6, which cannot be accessed by oil and, in use, is designed to house air.

The seal assembly 1 comprises a radially inner ring 7, which is integral to the shaft 4, a radially outer ring 8, which is integral to the casing 3, and a seal assembly 9, which is elastically deformable and is manufactured as one single piece, in particular made of an elastomer material, interposed between the inner ring 7 and the outer ring 8 and carried by the outer ring 8.

The inner ring 7 comprises an axial portion 10, which is pressed in a fluid-tight manner on the shaft 4. A radial portion 11 extending almost up to the casing 3 originates, inside the compartment 2, from the end of the inner ring 7 facing the environment 5.

The outer ring 8 comprises an axial portion 12, which is fitted in a fluid-tight manner on the casing 3, and a radial portion 13, which extends, in particular from an intermediate area 14 of the axial portion 12, towards the shaft 4. The outer ring 8, in particular the axial portion 12 thereof, carries—as described more in detail below—the seal element 9.

Preferably, as you can see in FIG. 1, the axial portion 12 of the outer ring 8 extends in a position facing the axial portion 10 of the inner ring 7.

Advantageously, with special reference to FIGS. 1 to 7, the seal element 9 comprises:
 a fitted portion 18, which is connected to the outer ring 8, in particular to the radial portion 13, more in particular to an end section 19 of the radial portion 13, so that the outer ring 8 can carry the seal element 9;
 an annular pad 20, which is relatively rigid and is adapted to cooperate in a sealing manner with a coupling portion 21 of the inner ring 7, in particular of the radial portion 11, the annular pad 20 being positioned, in use (in other words, with the seal assembly 1 fitted in the compartment 2), in particular in static conditions (still shaft 4), parallel to the coupling portion 21; and
 a spring portion 22, which is arranged between the fitted portion 18 and the annular pad 20 and is adapted to exert an elastic force upon the annular pad 20, so as to push the annular pad 20 towards the coupling portion 21, in particular in order to maintain the parallel arrangement between the annular pad 20 and the coupling portion 21 and make sure, in particular in static conditions (still shaft 4), that the oil does not access the environment 6.

Preferably, the seal element 9 further comprises an oblique portion 23 having a first end 24, which is connected to the annular pad 20, and a second end 25, which is opposite the end 24 and is connected to the spring portion 22. More in detail, the oblique portion 23 is adapted to transfer the elastic force exerted by the spring portion 22 onto the annular pad 20. Preferably, the oblique portion 23 is connected to an intermediate portion 26 of the annular pad 20. Advantageously, the oblique portion 23 extends from the annular pad 20 towards said axis A.

Preferably, the seal element 9 also comprises a dust seal lip 27, which is connected to a joining area 28 between the spring portion 22 and the oblique portion 23 and is designed to avoid interferences with the correct interaction between the annular pad 20 and the coupling portion 21 due to undesired particles (for example dust). In particular, the dust seal lip 27 is designed to forbid the access of particles to a space 29 (connected to the environment 6) which is substantially delimited by the inner ring 7, by the annular pad 20, by the oblique portion 23 and by the dust seal lip 27. Preferably, the dust seal lip 27 extends in an oblique manner from the joining area 28 towards the axis A, in particular towards the axial portion 10, without exerting a fluid sealing action with said axial portion 10. In particular, the dust seal lip 27 extends on the prolongation of the oblique portion 23 (even though, preferably, in use, the dust seal lip 27 has a slope that is slightly different from the one of the oblique portion 23).

More in detail, with special reference to FIGS. 1 to 3 and 5 to 7, the fitted portion 18 substantially has a U-shaped cross section. The fitted portion 18 comprises two annular interaction surfaces 33 and 34, which are parallel to and spaced apart from one another and between which the radial portion 13 is partially housed, in particular in the area of the end section 19. The surfaces 33 and 34 are joined to the radial portion 13 during the moulding step, thus defining a chemical gluing. The U-shaped cross section defined by the surfaces 33 and 34 fulfils the aim of maximizing the usable adhesion surface of the ring 8.

According to a possible alternative, which is not shown herein, the radial portion 13 of the ring 8 could also be mechanically interlocked, for example by means of an interference coupling, between the surfaces 33 and 34 of the fitted portion 18 of the seal element 9.

In further detail, the interaction surfaces 33 and 34 are oriented perpendicularly to the axis A.

More in detail and with special reference to FIGS. 1 to 7, the spring portion 22 is adapted to exert an elastic force that tends to axially push the annular pad 20 towards the coupling portion 21, so that, in particular in static conditions, the annular pad 20 is oriented parallel to the coupling portion 21. Preferably, the spring portion 22 has a cross section having a first curved portion 35, which has a convexity facing the environment 5, and a second curved portion 36, which has a convexity facing the environment 6. In particular, the cross section of the spring portion 22 substantially has the shape of a tilde. Preferably, the curved portion 35 is connected to the fitted portion 18 and the curved portion 36 is connected to the oblique portion 23.

More in detail and with special reference to FIGS. 1 to 7, the annular pad 20 extends, in particular in static conditions, parallel, in particular in a substantially straight manner, from a first outer end section 37 to a second outer end section 38, which is opposite the end section 37. In particular, the end section 37 is arranged towards the environment 5 and the end section 38 is arranged towards the environment 6.

Advantageously, the annular pad 20 comprises an annular seal edge 39, which projects towards the coupling portion 21 and is adapted to cooperate with the coupling portion 21 along a substantially linear area of contact. In particular, the annular seal edge 39 projects, in particular orthogonally, from a surface 40 of the pad 20 facing and, in particular, parallel to the coupling portion 21.

Preferably, the annular seal edge 39 is positioned in the area of the end section 37.

The seal element 9, in particular the annular pad 20, further comprises an annular groove 41, which is parallel to the annular seal edge 37 and extends from the annular seal edge 37 towards the end section 38. In other words, in use, the groove 41 radially extends, with respect to the axis A, from the annular seal edge 37 towards the axis A. The groove 41 is adapted to generate, in dynamic conditions (shaft 4 rotating around the axis A), a fluid-dynamic pumping action, which tends to push the oil away from the sealing area, thus moving it towards the environment 5. The fluid-dynamic action is obtained by generating a flow of an air fluid from the environment 6 to the environment 5 by means of the groove 41 and due to the rotation of the shaft 4.

More precisely, in use, in dynamic conditions, the fluid-dynamic action also determines a slight detachment of the seal edge 39 from the coupling portion 21, with a consequent reduction of the friction and the creation of an air cushion effect. In case of restoring of the static conditions, the fluid-dynamic action gives out and the action of the spring portion 22 ensures again the contact of the annular pad 20, in particular of the annular seal edge 39, with the coupling portion 21.

Preferably, the seal element 9, in particular the annular pad 20, comprises an annular edge 42 delimiting, together with the annular seal edge 39, the groove 41 and arranged between the annular seal edge 39 and the end section 38. In other words, the annular edge 42 is arranged, in use, between the annular seal edge 39 and the shaft 4.

More specifically, the annular edge 42 projects towards the coupling portion 21, in particular it projects, preferably in an orthogonal direction, from the surface 40.

More in particular, the annular seal edge 39 has a height, in a direction parallel to the axis A and with respect to the surface 40, that is greater than the height of the annular edge 42.

With special reference to FIGS. 4 to 7, the seal element 9, in particular the pad 20, comprises a plurality of crests 43 formed in the groove 41 and shaped to delimit channels 44 adapted to convey air, during the rotation of the shaft, towards the annular seal edge 39 increasing the pressure thereof. In particular, the crests 43 and the channels 44 are adapted to define the fluid-dynamic action in the best possible way, but they are not indispensable for the creation thereof.

Preferably, the crests 43 and the channels 44 are distributed along the entire groove 41.

Figure 5:
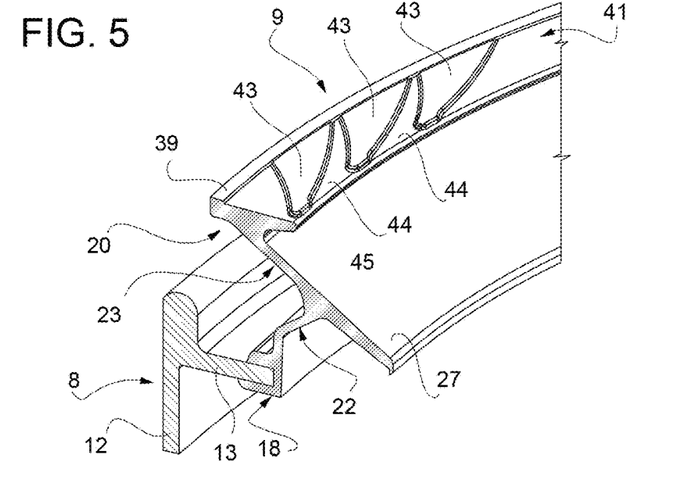
FIGS. 5 to 7 show, in a perspective view, some possible variants of the detail of FIG. 4.
Figures 6, 7:
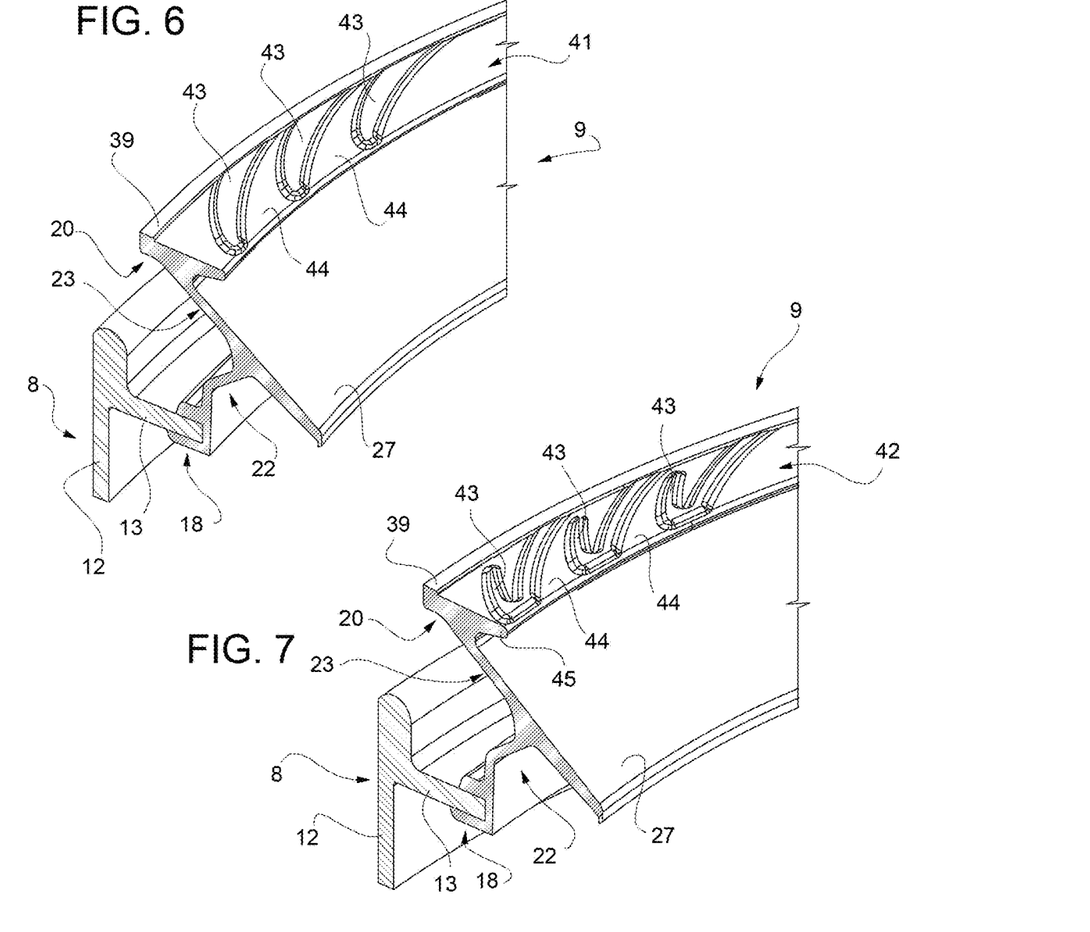

With special reference to FIGS. 5 to 7, the channels 44 delimited by the crests 43 can have different shapes (only some examples are shown in FIGS. 5 to 7), ranging from relatively simple shapes, such as for example a helical or a spiral shape, to more complicated and elaborated shapes. Preferably, the channels 44 are tapered towards the annular seal edge 39.

With special reference to FIGS. 1 to 7, the pad 20 further comprises a heel 45, which is arranged in the area of the end section 38 and is adapted to stabilize, in particular in static conditions, the contact between the annular seal edge 39 and the coupling portion 21. More in detail, the heel 45 extends radially relative to the axis A, in particular from the annular edge 42 towards the shaft 4. In other words, the heel 45 is radially interposed between the annular seal edge 39 and the axis A.

Figure 8:
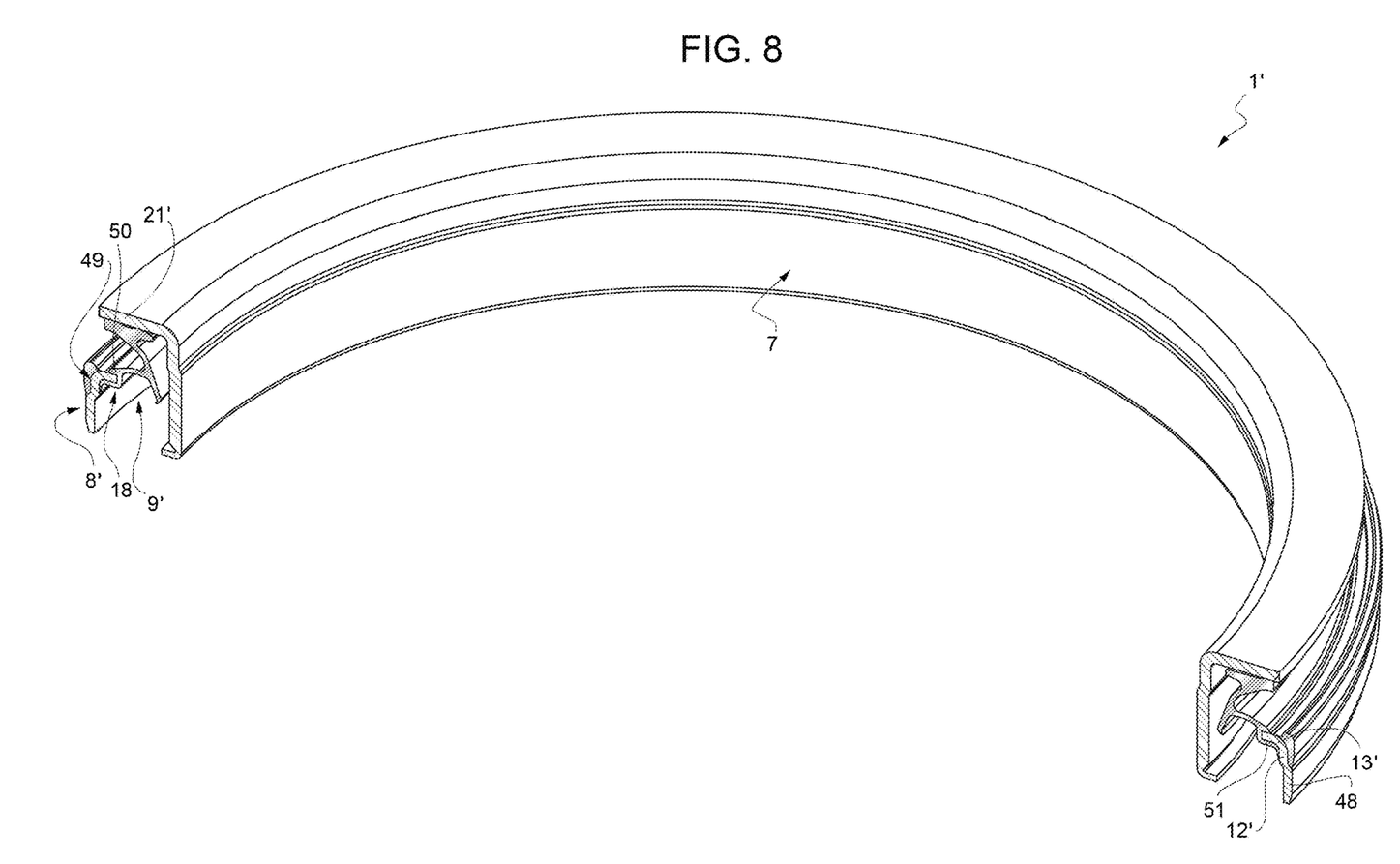
FIG. 8 is a perspective view, with an axial section, of a second embodiment of a seal assembly according to the invention.

In FIG. 8, number 1' indicates an alternative embodiment of a seal assembly according to the invention. The seal assembly 1' is similar to the seal assembly 1 and, for this reason, hereinafter it will be described only in terms of differences with respect to the seal assembly 1, using the same reference numbers for those parts that are equal or equivalent to the parts already described.

The seal assembly 1' is different from the seal assembly 1 in that it comprises a seal element 9', a coupling portion 21' and a ring 8' with shapes that are different from the ones of the similar components of the seal assembly 1.

In particular, the coupling portion 21' is in the area of an outer axial end portion of the ring 7, in particular said outer axial end portion faces the environment 5. In other words, the pad 20 extends up to the outer diameter of the ring 7.

Furthermore, the outer ring 8' comprises an axial portion 12', which is fitted in a fluid-tight manner on the casing 3, and a radial portion 13', which extends, in particular from an end 48 of the axial portion 12', towards the shaft 4. In particular, the ring 8' defines—together with the casing 3—a seat that is designed to house part of the seal element 9'.

Furthermore, the seal element 9' comprises a fitted portion 18' having a first interaction area 50, which, in use, is arranged in the environment 5, and a second interaction area 51, which, in use, is arranged in the environment 6. The area 50 and the area 51 house, between one another, the radial portion 13' and are joined to the radial portion 13' during the moulding step, thus defining a chemical gluing. The U-shaped cross section defined by the areas 50 and 51 fulfils the aim of maximizing the usable adhesion surface of the ring 8'.

According to a possible alternative, which is not shown herein, the radial portion 13' of the ring 8' could also be mechanically interlocked between the areas 50 and 51 of the fitted portion 18' of the seal element 9'.

In further detail, the area 50, in use, is partly housed in the seat 49 in a fluid-tight manner with respect to the casing 3. The area 51 extends along the entire axial portion 13'.

Figure 9:
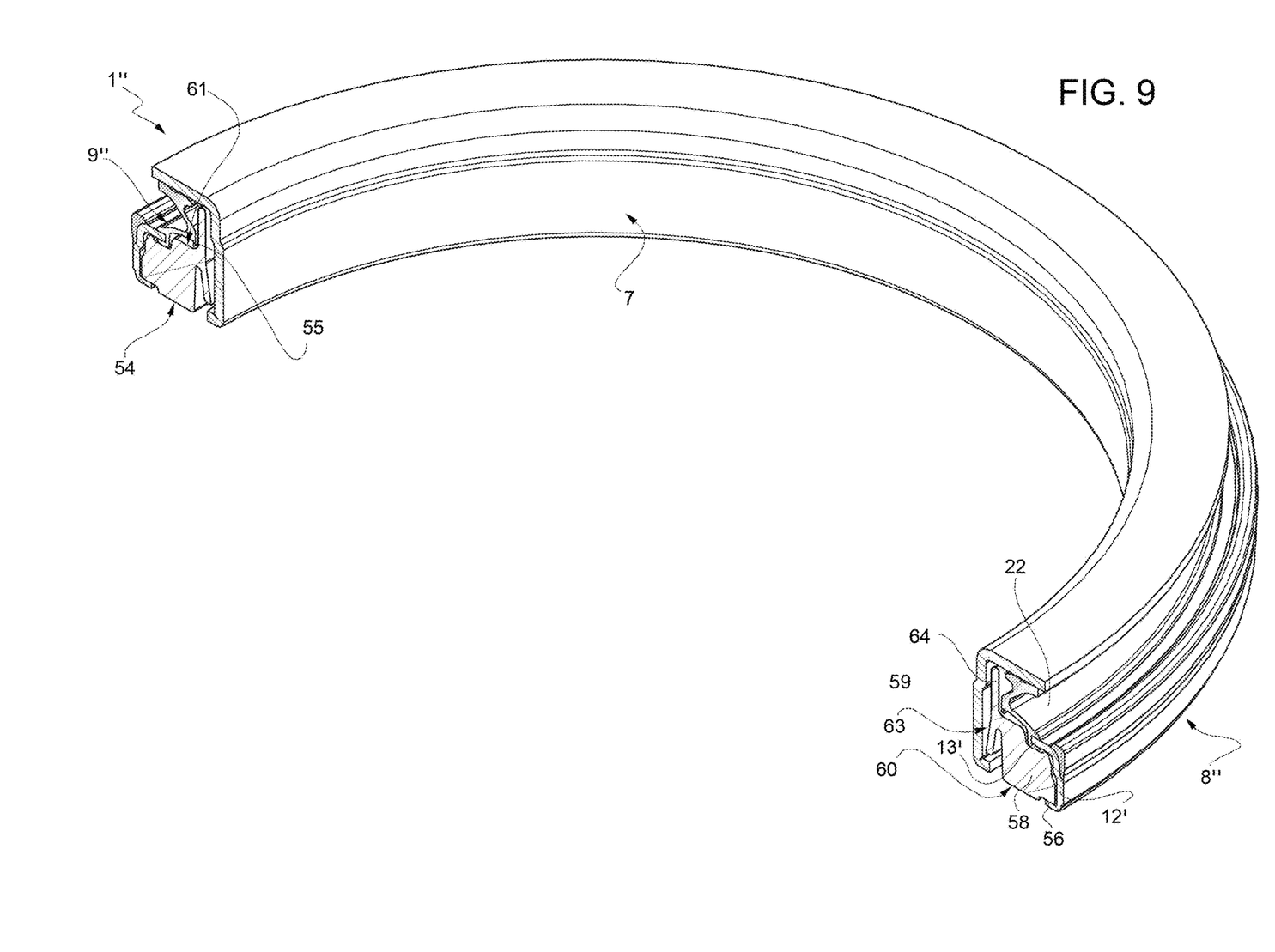
FIG. 9 is a perspective view, with an axial section, of a third embodiment of a seal assembly according to the invention.
Figure 10:
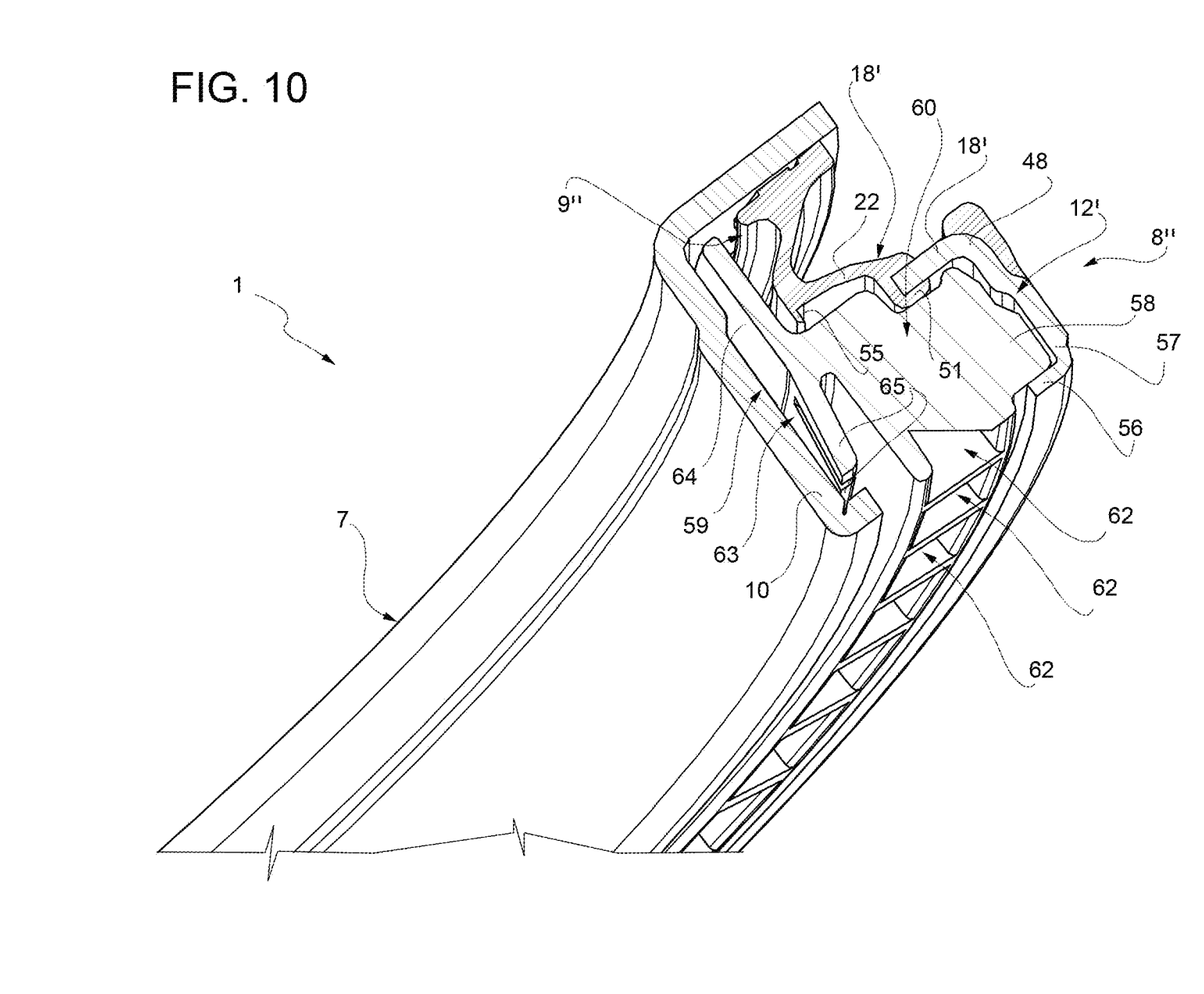
FIG. 10 is an enlarged view of a detail of the seal assembly of FIG. 9.

In FIGS. 9 and 10, number 1" indicates an alternative embodiment of a seal assembly according to the invention. The seal assembly 1" is similar to the seal assembly 1' and, for this reason, hereinafter it will be described only in terms of differences with respect to the seal assembly 1', using the same reference numbers for those parts that are equal or equivalent to the parts already described.

The seal assembly 1" is different from the seal assembly 1' in that it comprises a seal element 9" and a ring 8" with shapes that are different from those of the similar components of the seal assembly 1' and in that it further comprises a support element 54, which is connected to—and in particular supported by—the ring 8" and is adapted to define an oscillation limit for the spring portion 22 of the seal element 9" in the direction of the environment 6.

More in detail, the seal element 9" differs from the seal element 9' in that the dust seal lip 27 is not present and is replaced by a projecting portion 55, in particular with smaller sizes compared to the dust seal lip 27.

The ring 8" is different from the ring 8' in that it comprises a further radial portion 56 extending, in particular from a further end 57 of the axial portion 12' that is opposite the end 48, towards the shaft 4. The radial portion 56 substantially extends parallel to the radial portion 13'.

More specifically, the support element 54 is positioned, in use, between the environment 6 and the environment 9'". Preferably, the support element 54 is made of a plastic material.

The support element 54 comprises:
an anchoring portion 58, which is coupled to the ring 8", in particular to the radial portion 56;
a dust seal portion 59, which extends axially and is adapted to prevent undesired or contaminating particles from moving from the environment 6 to the environment 5; and
a main portion 60, which is radially arranged between the anchoring portion 58 and the dust seal portion 59 and is configured to give rigidity to the support element 54.

In further detail, the support element 54 is manufactured as one single piece.

Preferably, the anchoring portion 58 is at least partially interposed between the radial portion 56 and the radial portion 13'. In particular, the anchoring portion 58 is in contact with the radial portion 56 and with the fitted portion 18', in particular with the area 51.

The main portion 60 comprises a delimitation surface 61, which faces and is substantially complementary to the spring portion 22 of the seal element 9" as well as defines the oscillation limit for the spring portion 22 in the direction of the environment 6.

Preferably, the main portion 60 comprises, furthermore, a plurality of cavities 62, which are angularly distributed around the axis A and are adapted to permit, given the same rigidity, a reduction of the material needed to manufacture the support element 54.

Preferably, the dust seal portion 59 faces the axial portion 10. In particular, the dust seal portion 59 comprises an annular section 63 with flaps and a continuous annular section 64, which substantially faces the seal element 9".

In particular, the annular portion 63 with flaps comprises a plurality of flaps 65, which are angularly equally spaced apart from one another around the axis A and extend towards the environment 6.

The features of the seal assemblies 1, 1' and 1" according to the invention lead to evident advantages that can be obtained using it.

In particular, the pad 20 and, more precisely, the seal edge 39, in cooperation with the spring portion 22, ensure, in static conditions (still shaft 4), the sealing of the compartment 2 even in case the shaft 4 is arranged in an oblique position with respect to a horizontal position, with a consequent positioning of the seal assembly 1 partially in an oil bath.

Furthermore, the pad 20 always has the same interface with the coupling portion 21, regardless of the conditions existing in the environments 5 and 6.

The pad 20 has a high moment of inertia in relation to forces that act in a radial direction and result from pressures or depressions coming from the environment 5. Thanks to this, in case of depressions coming from the environment 5, there are no undesired noises and vibrations.

Furthermore, in dynamic conditions, the presence of grooves 42 generates an air flow towards the seal edge 39, increasing the pressure thereof. This permits a reduction of the friction between the pad 20 and the coupling portion 21 or 21' and prevents oil from getting into the air 6. The possible presence of the crests 43 and, respectively, of the channels 44, further improves this effect. In particular, the air volume needed to obtain this effect is smaller than the one required in known seal assemblies.

In case of the seal assembly 1", the presence of the support element 54 allows you to obtain the following advantages.

First of all, as the support element 54 is directly fixed to the ring 8", there is no misalignment between the different components of the seal assembly 1".

Furthermore, in static conditions and in case positive pressures are introduced from the environment 5 towards the environment 6, which is what happens, for example, during typical quality control tests carried out to check the sealing of vehicle engines, the support element 54 limits the possible oscillations of the spring portion 22 of the seal element 9", thus avoiding an undesired overturning of the annular pad 20.

Finally, the section 63 with flaps of the support element 54 defines an effective dust seal member.

Finally, the seal assemblies 1, 1' and 1" described and shown herein can be subjected to changes and variants, which do not go beyond the scope of protection set forth in the appended claims.

What is claimed is:

1. A seal assembly for sealing a compartment between a rotating member and a fixed element housing said rotating member, so as to prevent the passage of oil from a first to a second environment arranged on opposite sides of said compartment, said seal assembly comprising:
    a first ring fixed to said rotating member and having an axis;
    a second ring fixed to said fixed element and coaxial with the first ring; and
    an elastically deformable annular seal element coaxial with said axis;
    wherein said seal element is carried by said second ring and is connected to said second ring by means of a fitted portion;
    wherein the seal element comprises at least one annular pad adapted to cooperate in a sealed manner with a coupling portion of said first ring, the annular pad being positioned in use parallel to the coupling portion and extending substantially in a radial direction with respect to said axis;
    wherein the seal element is made in one single piece;
    wherein the annular pad comprises an annular seal edge, the annular seal edge projecting towards the coupling portion and being adapted to cooperate with said coupling portion along a substantially linear area of contact in static conditions;
    wherein the seal element further comprises a spring portion arranged between the fitted portion and the annular pad and configured to exert an elastic force on the annular pad so as to push the annular seal edge towards the coupling portion, said spring portion being configured, without the aid of further spring components, to orient the annular pad in static conditions in a substantially parallel manner to the coupling portion and to ensure, in static conditions, that the oil does not access the second environment;
    wherein the seal element further comprises an oblique portion having a first end, connected to the annular pad at a position interposed between the annular seal edge and said axis, and a second end, opposite the first end and connected to the spring portion;
    wherein, in use, the oblique portion extends from the annular pad towards said axis and is adapted to transfer the elastic force exerted by the spring portion onto the annular pad;
    wherein the annular pad further comprises a heel, distinct from said oblique portion, that extends radially with respect to said axis, is radially interposed between the connection position to the oblique portion and said axis, and is adapted to stabilize the contact between said annular seal edge and the coupling portion; and
    wherein the seal assembly does not have any other spring component biasing the annular pad.

2. The seal assembly according to claim 1, wherein the annular seal edge is positioned at an outer end portion of the annular pad, which is arranged towards the first environment.

3. The seal assembly according to claim 1, wherein the seal element further comprises an annular groove parallel to the annular seal edge and extending from the annular seal edge to a second outer end section of said annular pad, said outer end section being in use arranged towards the second environment; the annular groove being adapted to generate in use a fluid-dynamic pumping action to move the oil away from the seal area, directing it towards the first environment; said fluid-dynamic action being obtained by generating an air fluid flow from said second environment to said first environment by means of said groove and due to the rotation of said rotating member.

4. The seal assembly according to claim 3, wherein the seal element comprises an annular edge delimiting, together with the annular seal edge, the groove and arranged, in use, between the annular seal edge and said rotating member; wherein the annular edge projects towards the coupling portion.

5. The seal assembly according to claim 4, wherein the annular seal edge and the annular edge project from a surface of the annular pad facing the coupling portion and wherein the annular seal edge has a height with respect to said surface greater than a height of the annular edge.

6. The seal assembly according to claim 3, wherein the seal element comprises a plurality of crests formed in the groove and shaped to delimit channels adapted to convey air, during the rotation of said rotating member, towards said annular seal edge increasing the pressure thereof.

7. The seal assembly according to claim 1, wherein the spring portion presents a cross section having:
   a first curved section with convexity facing the first environment; and
   a second curved section with convexity facing the second environment.

8. The seal assembly according to claim 7, wherein the cross section of the spring portion has substantially a tilde shape; wherein the first curved section is connected to the fitted portion and the second curved section is connected to the oblique portion.

9. The seal assembly according to claim 1, wherein the spring portion is configured to exert an axial force on said annular pad.

10. The seal assembly according to claim 1, further comprising an annular supporting element supported by the radially outer ring and adapted to limit the oscillations of the spring portion in the direction of the second environment.

11. The seal assembly according to claim 10, wherein the annular support element comprises a main portion having a delimitation surface facing and substantially complementary to the spring portion of the seal element.

12. The seal assembly according to claim 11, wherein the annular support element is positioned, in use, between the second environment and the seal element and comprises a dust seal portion extending axially and adapted to prevent the passage of undesired particles from the second to the first environment.

13. The seal assembly according to claim 12, wherein the annular support element further comprises an anchoring portion coupled to the radially external ring and the main portion of the annular support element is radially interposed between the anchoring portion and the dust seal portion.

14. A seal assembly for sealing a compartment between a rotating member and a fixed element housing said rotating member, so as to prevent the passage of oil from a first to a second environment arranged on opposite sides of said compartment, said seal assembly comprising:
   a first ring fixed to said rotating member and having an axis;
   a second ring fixed to said fixed element; and
   an elastically deformable annular seal element;
   wherein the seal element comprises at least one annular pad adapted to cooperate in a sealed manner with a coupling portion of said first ring, the annular pad being positioned in use parallel to the coupling portion;
   wherein the annular pad comprises an annular seal edge, the annular seal edge projecting towards the coupling portion and being adapted to cooperate with said coupling portion along a substantially linear area of contact; and
   wherein the seal element further comprises a spring portion arranged between a fitted portion and the annular pad and configured to exert an elastic force on the annular pad so as to push the annular seal edge towards the coupling portion without the aid of further spring components, the spring portion being further configured, without the aid of further spring components, to orient the annular pad in a static condition in a substantially parallel manner to the coupling portion;
   wherein the seal element further comprises an oblique portion having a first end, connected to the annular pad at a position interposed between the annular seal edge and said axis, and a second end, opposite the first end and connected to the spring portion;
   wherein the annular pad further comprises a heel, distinct from said oblique portion, that extends radially with respect to said axis and is adapted to stabilize the contact between said annular seal edge and the coupling portion; and
   wherein the seal assembly does not have any other spring component biasing the annular pad.

15. The seal assembly according to claim 14, wherein the annular seal edge is positioned at an outer end portion of the annular pad, which is arranged towards the first environment.

16. The seal assembly according to claim 14, wherein the seal element further comprises an annular groove parallel to the annular seal edge and extending from the annular seal edge to a second outer end section of said annular pad, said outer end section being in use arranged towards the second environment; the annular groove being adapted to generate in use a fluid-dynamic pumping action to move the oil away from the seal area, directing it towards the first environment; said fluid-dynamic action being obtained by generating an air fluid flow from said second environment to said first environment by means of said groove and due to the rotation of said rotating member.

17. A seal assembly for sealing a compartment between a rotating member and a fixed element housing said rotating member, so as to prevent the passage of oil from a first to a second environment arranged on opposite sides of said compartment, said seal assembly comprising:
   a first ring fixed to said rotating member and having an axis;
   a second ring fixed to said fixed element and coaxial with the first ring; and
   an elastically deformable annular seal element, made in one single piece and coaxial with said axis;
   wherein the seal element is carried by said second ring and is connected to said second ring by means of a fitted portion;
   wherein the seal element comprises at least one annular pad adapted to cooperate in a sealed manner with a coupling portion of said first ring, the annular pad being positioned in use parallel to the coupling portion;
   wherein the annular pad comprises an annular seal edge, the annular seal edge projecting towards the coupling portion and being adapted to cooperate with said coupling portion along a substantially linear area of contact in static conditions;

wherein the seal element further comprises a spring portion arranged between the fitted portion and the annular pad and adapted to exert an elastic force on the annular pad so as to push the annular seal edge towards the coupling portion; and wherein the seal element further comprises an annular groove parallel to the annular seal edge and extending from the annular seal edge to a second outer end section of said annular pad, said outer end section being in use arranged towards the second environment; the annular groove being adapted to generate in use a fluid-dynamic pumping action to move the oil away from the seal area, directing it towards the first environment; said fluid-dynamic action being obtained by generating an air fluid flow from said second environment to said first environment by means of said groove and due to the rotation of said rotating member.

18. The seal assembly according to claim 1, wherein the heel comprises a length and a thickness, the length of the heel extending radially with respect to said axis.

* * * * *